United States Patent
Vignali

(10) Patent No.: US 12,391,388 B2
(45) Date of Patent: Aug. 19, 2025

(54) RECIRCULATION AIR MOTOR DRIVEN ACM

(71) Applicant: Hamilton Sundstrand Corporation, Charlotte, NC (US)

(72) Inventor: Mark G. Vignali, Simsbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 226 days.

(21) Appl. No.: 18/075,154

(22) Filed: Dec. 5, 2022

(65) Prior Publication Data
US 2024/0182175 A1  Jun. 6, 2024

(51) Int. Cl.
*B64D 13/06*  (2006.01)

(52) U.S. Cl.
CPC ...... *B64D 13/06* (2013.01); *B64D 2013/0618* (2013.01); *B64D 2013/0648* (2013.01); *B64D 2013/0688* (2013.01)

(58) Field of Classification Search
CPC .......... B64D 13/06; B64D 2013/0688
See application file for complete search history.

(56) References Cited

U.S. PATENT DOCUMENTS

| | | |
|---|---|---|
| 4,262,495 A | 4/1981 | Gupta et al. |
| 4,503,666 A * | 3/1985 | Christoff ........ B64D 41/00 60/785 |
| 5,442,905 A | 8/1995 | Claeys et al. |
| 6,629,428 B1 | 10/2003 | Murry |
| 7,322,202 B2 | 1/2008 | Zywiak et al. |
| 7,578,136 B2 | 8/2009 | Derouineau et al. |
| 10,202,197 B2 | 2/2019 | Bammann et al. |
| 2004/0014419 A1* | 1/2004 | Lents ............... B64D 13/06 454/237 |
| 2005/0126204 A1* | 6/2005 | Piccirilli ........... F24F 5/0085 62/401 |
| 2006/0059927 A1 | 3/2006 | Zywiak et al. |
| 2008/0264084 A1* | 10/2008 | Derouineau ........ B64D 13/06 62/401 |
| 2010/0323601 A1 | 12/2010 | Cremers et al. |
| 2016/0059927 A1 | 3/2016 | Bryne |
| 2016/0083100 A1 | 3/2016 | Bammann et al. |
| 2019/0009912 A1* | 1/2019 | Matsui ............... B64D 13/02 |

OTHER PUBLICATIONS

Extended European Search Report for European Patent Application No. 23214067.3, Dated Jul. 9, 2024, 13 Pages.
Partial European Search Report for EP Application No. 23214067.3, dated Apr. 16, 2024, 7 pages.

* cited by examiner

Primary Examiner — Eric S Ruppert
(74) Attorney, Agent, or Firm — Kinney & Lange, P.A.

(57) ABSTRACT

A conditioning system for recirculation air of an aircraft cabin includes an air cycle system in fluid communication with the aircraft cabin and configured to receive a recirculation airflow from the aircraft cabin and a mixing chamber disposed in fluid communication between the air cycle system and the aircraft cabin. The mixing chamber is configured to mix the recirculation airflow received from the air cycle system with a conditioned airflow received from an environmental control system pack of the aircraft.

18 Claims, 2 Drawing Sheets

RECIRCULATION AIR MOTOR DRIVEN ACM

BACKGROUND

The present disclosure relates generally to an aircraft environmental control system (ECS) and more particularly to recirculation air in an ECS.

Commercial aircraft include recirculation fans to circulate cabin air. The recirculation fans simply move the cabin air while also adding some heat. Cooling of the aircraft cabin, including cooling of the recirculation air, is provided by the ECS. Conventional aircraft include a bleed system in which compressed air is extracted from the engine core through a high pressure or low pressure bleed port and delivered to ECS air conditioning packs to provide conditioned air for the aircraft cabin. Use of bleed air for cabin cooling in modern gas turbine engines can have a dramatic impact on fuel consumption. ECS packs can be required to cool air far below aircraft cabin temperature requirements (e.g., −40 degrees Fahrenheit) to minimize the amount the air needed to be delivered to the aircraft cabin and thereby minimize the amount of bleed air extracted. Conditioned air from ECS packs is mixed with a predetermined and much larger amount of cabin recirculated air to warm the conditioned air to a comfortable temperature for the aircraft cabin. There is a need to further reduce the amount of bleed air extracted for cabin cooling to further reduce fuel consumption.

SUMMARY

In one aspect, a conditioning system for recirculation air of an aircraft cabin includes an air cycle system in fluid communication with the aircraft cabin and configured to receive a recirculation airflow from the aircraft cabin and a mixing chamber disposed in fluid communication between the air cycle system and the aircraft cabin. The mixing chamber is configured to mix the recirculation airflow received from the air cycle system with a conditioned airflow received from an environmental control system pack of the aircraft.

In another aspect, a conditioning system for recirculation air of an aircraft cabin includes a compressor, a turbine, and a heat exchanger. The compressor has a compressor inlet and a compressor outlet. The compressor inlet is in fluid communication with the aircraft cabin. The compressor is disposed to receive a recirculation airflow from the aircraft cabin. The turbine has a turbine inlet and a turbine outlet. The turbine outlet is in fluid communication with the aircraft cabin. The aircraft cabin is disposed to receive the recirculation airflow from the turbine. The heat exchanger is in fluid communication with each of the compressor and the aircraft cabin and configured to transfer thermal energy between a cabin discharge airflow received from the aircraft cabin and the recirculation airflow received from the compressor.

In yet another aspect, a method of supplying conditioned air to an aircraft cabin includes conducting, in a cooling operation, a recirculation airflow received from the aircraft cabin through an air cycle system including a compressor, a heat exchanger, and a turbine; and conducting, in the cooling operation, the recirculation airflow received from an outlet of the air cycle system to a mixing chamber. The mixing chamber is configured to mix the recirculation airflow with a conditioned airflow received from an environmental control system pack of the aircraft to produce a cabin airflow for delivery to the aircraft cabin.

The present summary is provided only by way of example, and not limitation. Other aspects of the present disclosure will be appreciated in view of the entirety of the present disclosure, including the entire text, claims and accompanying figures.

Figure 1:
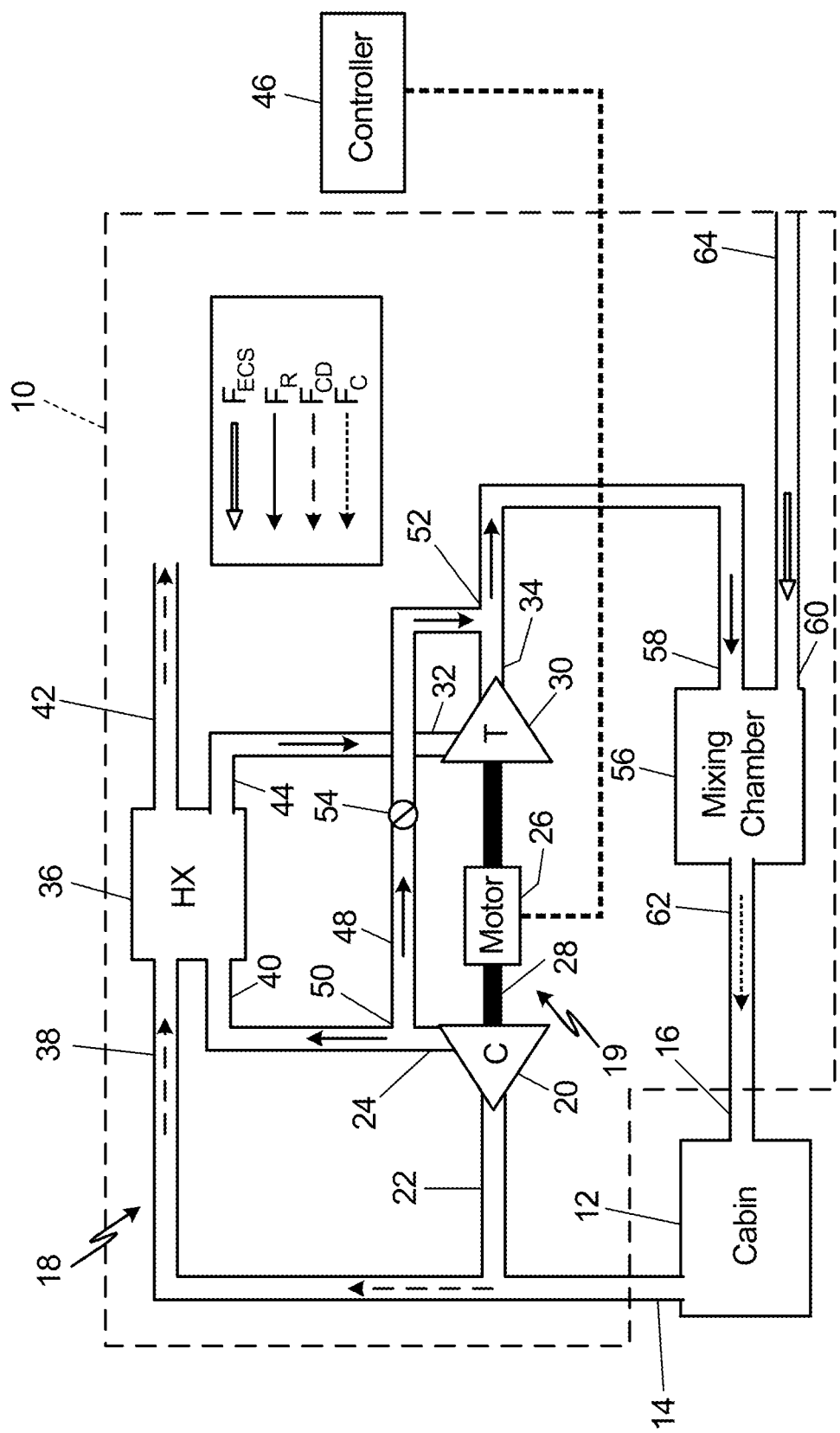
FIG. 1 is a schematic diagram of a conditioning system including a motor-driven air cycle system for recirculation air of an aircraft cabin.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present disclosure is directed to a conditioning system for recirculation air of an aircraft cabin that can be used to provide supplemental cooling of the aircraft cabin. FIG. 1 is a schematic diagram of a conditioning system including a motor-driven air cycle machine (ACM) for recirculation air of an aircraft cabin. The motor-driven air cycle machine can be used in place of a conventional recirculation fan to provide the aircraft cabin recirculation flow plus supplemental cooling capacity. The supplemental cooling provided by the conditioned recirculation air can reduce the ECS cooling capacity. This can allow lower ECS flow rates or higher ECS outlet temperatures, which may improve engine efficiency. The disclosed system can improve cooling performance or may allow for a smaller ECS system, while also eliminating the need for a recirculation fan.

FIG. 1 shows conditioning system 10 configured to provide aircraft cabin 12 recirculation flow plus supplemental cooling. Cabin outlet 14, cabin inlet 16, air cycle system 18, air cycle machine 19, compressor 20, compressor inlet 22, compressor outlet 24, motor 26, shaft 28, turbine 30, turbine inlet 32, turbine outlet 34, heat exchanger 36, first and second heat exchanger inlets 38 and 40, first and second heat exchanger outlets 42 and 44, controller 46, bypass line 48, bypass inlet 50, bypass outlet 52, valve 54, mixing chamber 56, first and second mixing chamber inlets 58 and 60, mixing chamber outlet 62, ECS outlet 64, recirculation airflow $F_R$, conditioned ECS airflow $F_{ECS}$, cabin airflow Fc, and cabin discharge airflow $F_{CD}$ are shown. Aircraft cabin 12 is in fluid communication with mixing chamber 56 and air cycle system 18. Air cycle system 18 includes air cycle machine 19, heat exchanger 36, and, optionally, bypass line 48. Air cycle machine 19 includes compressor 20, turbine 30, motor 26. Air cycle system 18 is configured to receive recirculation airflow $F_R$ from aircraft cabin 12 and deliver a conditioned recirculation airflow $F_R$ to mixing chamber 56. Mixing chamber 56 is configured to receive and mix the conditioned recirculation airflow $F_R$ from air cycle system 18 and conditioned ECS airflow $F_{ECS}$ from an ECS pack (not shown) to provide conditioned cabin airflow Fc. Heat exchanger is configured to receive cabin discharge airflow $F_{CD}$ from aircraft cabin 12 and recirculation airflow $F_R$ from compressor outlet 24. Heat exchanger 36 is configured to transfer thermal energy from recirculation airflow $F_R$ to cabin discharge airflow $F_{CD}$ to cool recirculation airflow $F_R$. Bypass line 48 connects compressor outlet 24 to mixing chamber 56, thereby bypassing heat exchanger 36 and turbine 30. Bypass line 48 is configured for use in heating recirculation airflow $F_R$.

Air cycle machine 19 is a motor-driven air cycle machine including compressor 20, turbine 30, and motor 26. Compressor 20 and turbine 30 are disposed on shaft 28. Compressor 20 can be a variable speed compressor. Motor 26 is configured to drive compressor 20. Turbine 30 can provide additional driving force for compressor 20. Motor 26 can be an electric motor. Motor 26 is in electronic communication with controller 46. Controller 46 is configured to regulate a rotational speed of compressor 20. The speed of compressor can be adjusted to meet varying cooling demands of aircraft cabin 12 based on, for example, an air temperature in aircraft cabin 12, a temperature of the ECS conditioned airflow FECS, a temperature of conditioned cabin airflow FC, a temperature of recirculation airflow FC at turbine outlet 34, or any combination thereof. Controller 46 can be in electronic communication with one or more temperature sensors (not shown).

Compressor 20 can be a variable speed centrifugal compressor configured draw recirculation airflow FR from aircraft cabin 12 and to compress recirculation airflow FR. Other types of compressors, including axial compressors and single-stage compressors are contemplated. Compressor 20 is configured for fluid communication with aircraft cabin 12 and at least one of heat exchanger 36 and mixing chamber 56 (via bypass line 48) depending on a mode of operation as discussed further herein. Compressor 20 includes compressor inlet 22 and compressor outlet 24. Compressor inlet 22 is arranged to receive recirculation airflow FR from aircraft cabin 12. Compressor outlet is configured to deliver the compressed recirculation airflow FR to heat exchanger 36 or to mixing chamber 56 via bypass line 48. In a cooling operation, bypass line 48 is closed via valve 54, such that all compressed recirculation airflow FR from compressor 20 is delivered to heat exchanger 36. If heating of aircraft cabin 12 is required, valve 54 can be opened to allow flow of the compressed recirculation airflow through bypass line 48 to mixing chamber 56, thereby bypassing heat exchanger 36 and turbine 30.

Heat exchanger 36 is in fluid communication with compressor outlet 24 and aircraft cabin 12. Heat exchanger 36 is an air-to-air heat exchanger. Heat exchanger 36 is arranged to receive cabin discharge airflow FCD from aircraft cabin 12 and to receive compressed recirculation airflow FR from compressor 20. A flow of cabin discharge airflow FCD can be constant. Cabin discharge airflow FCD is an airflow that is removed from aircraft cabin 12 and exhausted from the aircraft. Heat exchanger 36 is configured to place the compressed recirculation airflow FR in thermal communication with cabin discharge airflow FCD to cool the compressed recirculation airflow FR.

Heat exchanger 36 includes a first fluid flow path for conveying the compressed recirculation airflow FR and a second fluid flow path for conveying the cabin discharge airflow FCD. The first and second fluid flow paths are fluidly isolated and arranged in thermal communication. The first fluid flow path includes fluidly connected first heat exchanger inlet 38 and first heat exchanger outlet 42. The second flow path includes fluidly connected second heat exchanger inlet 40 and second heat exchanger outlet 44.

First heat exchanger inlet 38 is fluidly coupled to aircraft cabin 12 and configured to receive cabin discharge airflow FCD from aircraft cabin 12. Second heat exchanger inlet 40 is fluidly coupled to compressor 20 and configured to receive the compressed recirculation airflow FR from compressor 20. Heat is transferred from compressed recirculation airflow FR to cabin discharge airflow FCD in heat exchanger 36, thereby lowering a temperature of the compressed recirculation airflow FR. The cooled compressed recirculation airflow FR is delivered from second heat exchanger outlet 44 to turbine 30. The heated cabin discharge airflow FCD exits heat exchanger 36 at heat exchanger outlet 42 and can be exhausted overboard, for example, through and cabin outflow valve or thrust recovery outflow valve.

As illustrated, heat exchanger 36 and compressor 20 are fluidly coupled to aircraft cabin 12 via cabin outlet 14, which can be a cabin outflow passage configured to deliver a cabin airflow which is divided between cabin discharge airflow FCD and recirculation airflow FR. It will be understood by one of ordinary skill in the art that separation of cabin discharge airflow FCD and recirculation airflow FR can occur at aircraft cabin 12 or between cabin outlet 14 and compressor 20 and heat exchanger 36.

Cabin discharge airflow FCD is a preferred example of a heat sink for recirculation airflow FR, however, other heat sinks are contemplated. For example, in alternative embodiments, heat exchanger 36 can be configured to receive a ram airflow in place of cabin discharge airflow FCD for cooling the compressed recirculation airflow FR. Use of ram air can increase drag and, therefore, may be less preferrable. Use of cabin discharge airflow FCD as a heat sink can reduce the overall ram air usage in flight thereby reducing drag. Additionally, the heat added to cabin discharge airflow FCD in heat exchanger 36 may also provide for higher thrust recovery through an outflow nozzle as cabin airflow FCD is exhausted.

The cooled compressed recirculation airflow FR is expanded through turbine 30. Expansion of recirculation airflow FR through turbine 30 can drive compressor 20. Air cycle system 18 can be configured to provide recirculation airflow FR at turbine outlet 34 at a pressure substantially approximating or equal to a pressure of recirculation airflow FR at compressor inlet 22. Recirculation airflow FR cools as it expands. Because some thermal energy has been removed by heat exchanger 36, expansion of recirculation airflow FR cools recirculation airflow FR to a temperature below a temperature of recirculation airflow FR at compressor inlet 22.

The cooled recirculation airflow FR is delivered to mixing chamber 56 where it is mixed with ECS conditioned airflow FECS to provide supplemental cooling for conditioned cabin airflow FC. Mixing chamber 56 is fluidly coupled to turbine outlet 34, ECS outlet 64, and aircraft cabin 12. ECS outlet 64 can be fluidly coupled to one or more ECS packs (not shown). Mixing chamber 56 includes first and second mixing chamber inlets 58 and 60 and mixing chamber outlet 62. First mixing chamber inlet 58 is configured for fluid communication with each of turbine outlet 34 and bypass outlet 52 and configured to receive recirculation airflow FR. Second mixing chamber inlet 60 is fluidly coupled to ECS outlet 64 and configured to receive conditioned ECS airflow FECS. Mixing chamber outlet 62 is fluidly coupled to cabin inlet 16 and configured to deliver conditioned cabin airflow FC to aircraft cabin 12.

The supplemental cooling provided by air cycle system 18 can reduce the required ECS cooling capacity. For example, the same cooling requirements can be achieved with lower conditioned ECS airflow FESC flow rates or with higher temperature conditioned ECS airflow FECS.

Controller 46 can be used to regulate a speed of compressor 20 to provide a desired supplemental cooling capacity. As previously discussed, controller 46 can be in electronic communication with one or more temperature sensors (not shown) configured to sense an air temperature of any of a plurality of locations or airflows of conditioning assembly 10 or aircraft cabin 12, including but not limited to a temperature of the ECS conditioned airflow FECS, a temperature of conditioned cabin airflow FC, and a temperature of recirculation airflow FC at turbine outlet 34. Controller 46 can be configured to regulate the speed of compressor 20 based on one or more sensed temperatures.

Bypass line 48 is a fluid conduit configured to deliver a heating fluid to conditioned ECS airflow FECS to accommodate heating demands of aircraft cabin 12. Bypass line 48 is fluidly coupled to compressor outlet 24 and mixing chamber 56. Valve 54 can be configured to selectively open or close bypass line 48 to recirculation airflow FR. Valve 54 can be regulated by controller 46. During a cabin heating operation, valve 54 can be opened to allow the compressed recirculation airflow FR from compressor 20 to bypass heat exchanger 36. Recirculation airflow FR absorbs heat as it is compressed by compressor 20. Bypass line 48 is configured to deliver the heated compressed recirculation airflow FR to mixing chamber 56 to provide supplemental heating to conditioned ECS airflow FECS to accommodate heating demands of aircraft cabin 12.

Figure 2:
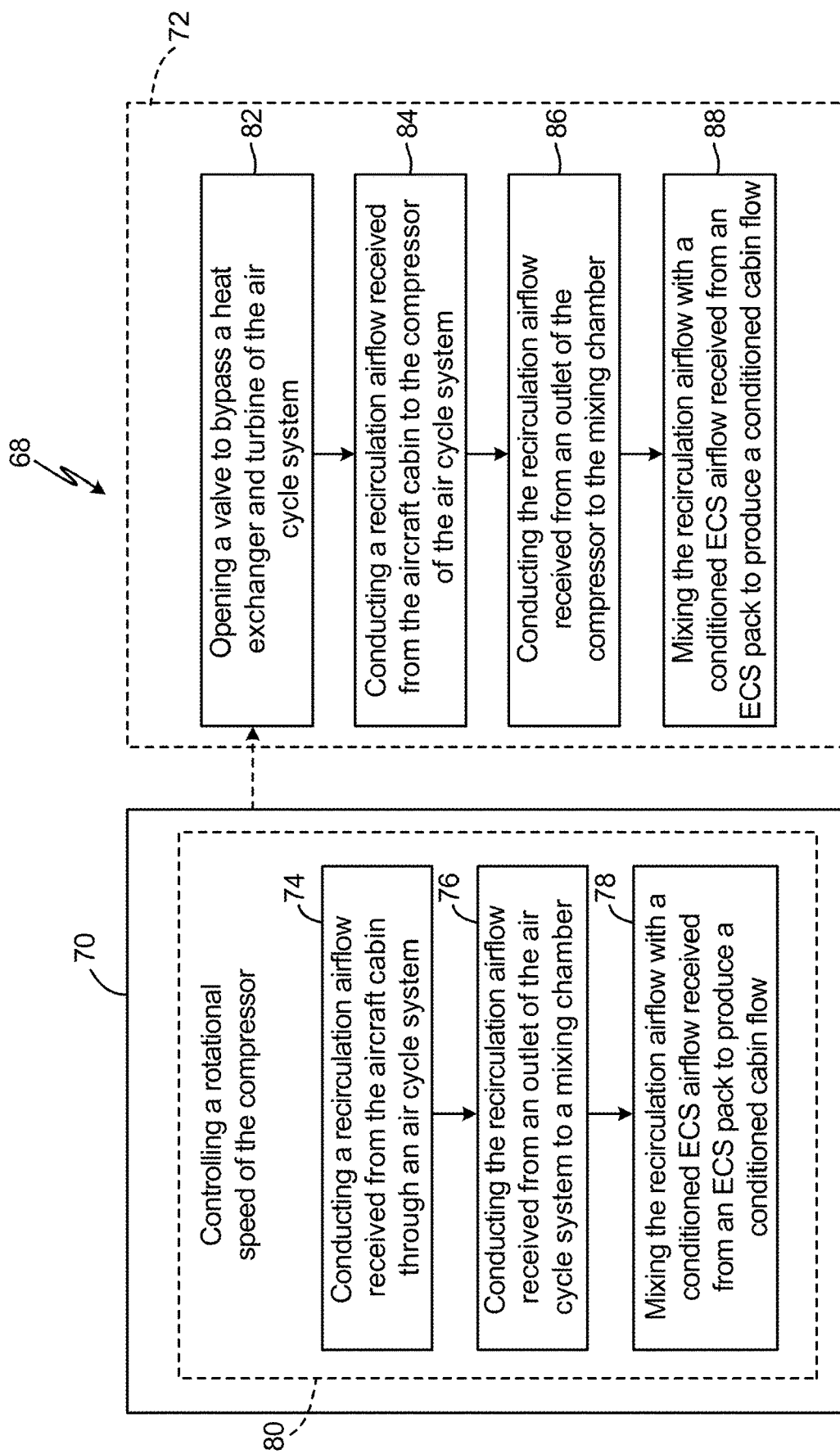
FIG. 2 is a flow chart of a method for providing for supplying conditioned air to an aircraft cabin.

FIG. 2 is a flow chart of method 68 for supplying conditioned air to an aircraft cabin. FIG. 2 shows cooling operation 70 and heating operation 72. During cooling operation 70, conditioning system 10 provides supplemental cooling.

In step 74, recirculation airflow FR received from aircraft cabin 12 is conducted though air cycle system 18. Motor 26 can be used to drive air cycle machine 19, which draws recirculation airflow FR from aircraft cabin 12. Recirculation airflow FR is compressed by compressor 20, cooled by heat exchanger 36, and expanded through turbine 30 to produce cooled recirculation airflow FR. Recirculation airflow FR at turbine outlet 34 has a lower temperature than the recirculation airflow FR received from aircraft cabin 12. In step 76, the cooled recirculation airflow FR received from an outlet (turbine outlet 34) of air cycle system 18 is conducted to mixing chamber 56. In step 78, mixing chamber 56 mixes the cooled recirculation airflow FR received from air cycle system 18 with conditioned ECS airflow FECS received from an ECS pack via ECS outlet 64 to produce conditioned cabin airflow FC for delivery to aircraft cabin 12. Step 80 includes controlling a rotational speed of compressor 20 based on at least one of an air temperature of aircraft cabin 12, an air temperature of conditioned cabin airflow FC, an air temperature of recirculation airflow FR at turbine outlet 34, an air temperature of conditioned ECS airflow FECS, or a combination thereof. Step 80 can occur at any time to regulate a cooling capacity of recirculation airflow FC.

During heating operation 72, conditioning system 10 provides supplemental heating. Step 82 includes controlling valve 54 configured to regulate flow of recirculation airflow FR through bypass line 48. Controller 46 can open or close valve 54 to allow recirculation airflow FR to bypass heat exchanger 36 and turbine 30 based on at least one of an air temperature of aircraft cabin 12, an air temperature of conditioned cabin airflow FC, an air temperature of recirculation airflow FR at turbine outlet 34, an air temperature of conditioned ECS airflow FECS, or a combination thereof. Step 72 can occur at any time to provide supplemental heating conditioned cabin airflow FC. In step 84, recirculation airflow FR received from aircraft cabin 12 is conducted to compressor 20 of air cycle system 18 where recirculation airflow FR is compressed and thereby heated. In step 86, the heated compressed recirculation airflow FR received from compressor outlet 24 is conducted to mixing chamber 56 via bypass line 48, thereby bypassing heat exchanger 36 and turbine 30. In step 88, mixing chamber 56 mixes and expands the heated recirculation airflow FR received bypass line 48 with conditioned ECS airflow FECS received from an ECS pack via ECS outlet 64 to produce conditioned cabin airflow FC for delivery to aircraft cabin 12.

The disclosed motor-driven air cycle machine can be used in place of a conventional recirculation fan to provide the aircraft cabin recirculation flow plus supplemental cooling capacity. The supplemental cooling provided by the conditioned recirculation air can reduce the ECS cooling capacity. This can allow lower ECS flow rates or higher ECS outlet temperatures, which may improve engine efficiency. The disclosed system can improve cooling performance or may allow for a smaller ECS system, while also eliminating the need for a recirculation fan. A conventional ECS (not shown) uses ram air as a heat sink, which increases drag. Use of cabin discharge airflow as a heat sink can reduce the overall ram air usage in flight thereby reducing drag. Additionally, the heat added to the cabin discharge airflow in the heat exchanger of the air cycle system may also provide for higher thrust recovery through a cabin outflow valve or thrust recovery outflow valve as the cabin discharge airflow is exhausted.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A conditioning system for recirculation air of an aircraft cabin includes an air cycle system in fluid communication with the aircraft cabin and configured to receive a recirculation airflow from the aircraft cabin and a mixing chamber disposed in fluid communication between the air cycle system and the aircraft cabin. The mixing chamber is configured to mix the recirculation airflow received from the air cycle system with a conditioned airflow received from an environmental control system pack of the aircraft.

The conditioning system of the preceding paragraph can optionally include, additionally and/or alternatively, any one or more of the following features, configurations and/or additional components:

The conditioning system of the preceding paragraphs, wherein the air cycle system includes a compressor in fluid communication with the aircraft cabin, the compressor configured to receive the recirculation airflow from the aircraft cabin; a motor configured to drive the compressor; a heat exchanger in fluid communication with the compressor, the heat exchanger configured to receive the recirculation airflow from the compressor; and a turbine in fluid communication with the heat exchanger, the turbine configured to receive the recirculation airflow from the heat exchanger.

The conditioning system of any of the preceding paragraphs, wherein the heat exchanger is in fluid communication with the aircraft cabin, the heat exchanger configured to receive a discharge airflow from the aircraft cabin and configured to transfer thermal energy between the recirculation airflow and the discharge airflow.

The conditioning system of any of the preceding paragraphs can further include a recirculation airflow bypass line arranged in fluid communication between the compressor and the mixing chamber, the recirculation airflow bypass line configured to receive the recirculation airflow from the compressor, the mixer configured to mix the recirculation flow received from the recirculation bypass line with the conditioned airflow received from the environmental control system pack.

The conditioning system of any of the preceding paragraphs can further include a valve configured to regulate the flow of the recirculation airflow through the bypass line.

The conditioning system of any of the preceding paragraphs can further include a controller in electronic communication with the motor, the controller configured to regulate a rotational speed of the compressor.

The conditioning system of any of the preceding paragraphs, wherein the conditioned airflow received from the environmental control system pack of the aircraft is a conditioned bleed air from a compressor section of a core engine of the aircraft.

A conditioning system for recirculation air of an aircraft cabin includes a compressor, a turbine, and a heat exchanger. The compressor has a compressor inlet and a compressor outlet. The compressor inlet is in fluid communication with the aircraft cabin. The compressor is disposed to receive a recirculation airflow from the aircraft cabin. The turbine has a turbine inlet and a turbine outlet. The turbine outlet is in fluid communication with the aircraft cabin. The aircraft cabin is disposed to receive the recirculation airflow from the turbine. The heat exchanger is in fluid communication with each of the compressor and the aircraft cabin and configured to transfer thermal energy between a cabin discharge airflow received from the aircraft cabin and the recirculation airflow received from the compressor.

The conditioning system of the preceding paragraph can optionally include, additionally and/or alternatively, any one or more of the following features, configurations and/or additional components:

The conditioning system of the preceding paragraphs can further include a motor electrically coupled to the compressor and configured to drive the compressor.

The conditioning system of any of the preceding paragraphs can further include a controller in electronic communication with the motor, the controller configured to modulate a rotational speed of the compressor.

The conditioning system of any of the preceding paragraphs, wherein the heat exchanger further includes first and second fluid flow paths. The first fluid flow path includes a first inlet in fluid communication with the compressor outlet and a first outlet in fluid communication with the first inlet and the turbine. The second fluid flow path includes a second inlet in fluid communication with the aircraft cabin, the second inlet configured to receive the cabin discharge airflow and a second outlet in fluid communication with the second inlet an exhaust outlet. The first fluid flow path and the second fluid flow path are fluidly isolated and arranged in thermal communication.

The conditioning system of any of the preceding paragraphs can further include a bypass line, the bypass line having a bypass inlet in fluid communication with the compressor outlet and a bypass outlet in fluid communication with the aircraft cabin, wherein the aircraft cabin is disposed to receive the recirculation airflow from the bypass outlet.

The conditioning system of any of the preceding paragraphs can further include a valve configured to modulate flow of the recirculation airflow through each of the heat exchanger and the bypass line.

The conditioning system of any of the preceding paragraphs can further include a mixing chamber having a first chamber inlet in fluid communication with each of the turbine outlet and the bypass outlet, a second chamber inlet in fluid communication with an environmental control system pack of the aircraft, and a chamber outlet in fluid communication with the aircraft cabin. The mixing chamber is disposed to fluidly connect each of the turbine outlet and bypass outlet to the aircraft cabin.

A method of supplying conditioned air to an aircraft cabin includes conducting, in a cooling operation, a recirculation airflow received from the aircraft cabin through an air cycle system including a compressor, a heat exchanger, and a turbine; and conducting, in the cooling operation, the recirculation airflow received from an outlet of the air cycle system to a mixing chamber. The mixing chamber is configured to mix the recirculation airflow with a conditioned airflow received from an environmental control system pack of the aircraft to produce a cabin airflow for delivery to the aircraft cabin.

The method of the preceding paragraph can optionally include, additionally and/or alternatively, any one or more of the following features, configurations additional components, and/or steps:

The method of the preceding paragraphs can further include conducting, in a heating operation, the recirculation airflow received from the aircraft cabin to the compressor of the air cycle system, and conducting, in the heating operation, the recirculation airflow received from an outlet of the compressor to the mixing chamber via a fluid conduit bypassing the heat exchanger and the turbine.

The method of any of the preceding paragraphs, wherein the heat exchanger is configured to transfer thermal energy between the recirculation airflow received from an outlet of the compressor and a cabin discharge airflow received from the aircraft cabin.

The method of any of the preceding paragraphs can further include driving a compressor of the air cycle system with an electric motor.

The method of any of the preceding paragraphs can further include controlling a rotational speed of the compressor based on at least one of an air temperature of the aircraft cabin, an air temperature of the cabin airflow provided by the mixing chamber, an air temperature of the recirculation airflow received from the air cycle system outlet, and an air temperature of the conditioned airflow received from the environmental control system pack.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A conditioning system for recirculation air of an aircraft cabin, the conditioning system comprising:
   an air cycle system in fluid communication with the aircraft cabin and configured to receive a recirculation airflow from the aircraft cabin, the air cycle system comprising:
      a compressor in fluid communication with the aircraft cabin, the compressor configured to receive the recirculation airflow from the aircraft cabin;
      a motor configured to drive the compressor;
      a heat exchanger in fluid communication with the compressor, the heat exchanger configured to receive the recirculation airflow from the compressor; and
      a turbine in fluid communication with the heat exchanger, the turbine configured to receive the recirculation airflow from the heat exchanger; and
   a mixing chamber disposed in fluid communication between the air cycle system and the aircraft cabin, the mixing chamber configured to mix the recirculation airflow received from the air cycle system with a conditioned airflow received from an environmental control system pack of the aircraft, wherein the conditioned airflow from the environmental control system pack is isolated from the recirculation airflow from the air cycle system upstream of the mixing chamber.

2. The conditioning system of claim 1, wherein the heat exchanger is in fluid communication with the aircraft cabin, the heat exchanger configured to receive a discharge airflow from the aircraft cabin and configured to transfer thermal energy between the recirculation airflow and the discharge airflow.

3. The conditioning system of claim 1, and further comprising a recirculation airflow bypass line arranged in fluid communication between the compressor and the mixing chamber, the recirculation airflow bypass line configured to receive the recirculation airflow from the compressor, the mixer configured to mix the recirculation flow received from the recirculation bypass line with the conditioned airflow received from the environmental control system pack.

4. The conditioning system of claim 3, and further comprising a valve configured to regulate the flow of the recirculation airflow through the bypass line.

5. The conditioning system of claim 1, and further comprising a controller in electronic communication with the motor, the controller configured to regulate a rotational speed of the compressor.

6. The conditioning system of claim 1, wherein the conditioned airflow received from the environmental control system pack of the aircraft is a conditioned bleed air from a compressor section of a core engine of the aircraft.

7. A conditioning system for recirculation air of an aircraft cabin, the conditioning system comprising:
   a compressor having a compressor inlet and a compressor outlet, the compressor inlet in fluid communication with the aircraft cabin, wherein the compressor is disposed to receive only a recirculation airflow from the aircraft cabin;
   a turbine having a turbine inlet and a turbine outlet, the turbine outlet in fluid communication with the aircraft cabin, wherein the aircraft cabin is disposed to receive the recirculation airflow from the turbine; and
   a heat exchanger in fluid communication with each of the compressor and the aircraft cabin and configured to transfer thermal energy between a cabin discharge airflow received from the aircraft cabin and the recirculation airflow received from the compressor.

8. The conditioning system of claim 7, and further comprising a motor electrically coupled to the compressor and configured to drive the compressor.

9. The conditioning system of claim 8, and further comprising a controller in electronic communication with the motor, the controller configured to modulate a rotational speed of the compressor.

10. The conditioning system of claim 7, wherein the heat exchanger further comprises:
    a first fluid flow path comprising:
       a first inlet in fluid communication with the compressor outlet; and
       a first outlet in fluid communication with the first inlet and the turbine; and
    a second fluid flow path comprising:
       a second inlet in fluid communication with the aircraft cabin, the second inlet configured to receive the cabin discharge airflow; and
       a second outlet in fluid communication with the second inlet and an exhaust outlet;
    wherein the first fluid flow path and the second fluid flow path are fluidly isolated and arranged in thermal communication.

11. The conditioning system of claim 7, and further comprising a bypass line, the bypass line having a bypass inlet in fluid communication with the compressor outlet and a bypass outlet in fluid communication with the aircraft cabin, wherein the aircraft cabin is disposed to receive the recirculation airflow from the bypass outlet.

12. The conditioning system of claim 11, and further comprising a valve configured to modulate flow of the recirculation airflow through each of the heat exchanger and the bypass line.

13. The conditioning system of claim 12, and further comprising a mixing chamber having:
    a first chamber inlet in fluid communication with each of the turbine outlet and the bypass outlet;
    a second chamber inlet in fluid communication with an environmental control system pack of the aircraft; and
    a chamber outlet in fluid communication with the aircraft cabin;
    wherein the mixing chamber is disposed to fluidly connect each of the turbine outlet and bypass outlet to the aircraft cabin.

14. A method of supplying conditioned air to an aircraft cabin, the method comprising:
    conducting, in a cooling operation, a recirculation airflow received from the aircraft cabin through an air cycle system, the air cycle system comprising a compressor, a heat exchanger, and a turbine; and conducting, in the cooling operation, the recirculation airflow received from an outlet of the air cycle system to a mixing chamber;
wherein the mixing chamber is configured to mix the recirculation airflow with a conditioned airflow received from an environmental control system pack of the aircraft to produce a cabin airflow for delivery to the aircraft cabin wherein the conditioned airflow from the environmental control system pack is isolated from the recirculation airflow from the air cycle system upstream of the mixing chamber.

15. The method of claim 14, and further comprising:
conducting, in a heating operation, the recirculation airflow received from the aircraft cabin to the compressor of the air cycle system;
conducting, in the heating operation, the recirculation airflow received from an outlet of the compressor to the mixing chamber via a fluid conduit bypassing the heat exchanger and the turbine.

16. The method of claim 14, wherein the heat exchanger is configured to transfer thermal energy between the recirculation airflow received from an outlet of the compressor and a cabin discharge airflow received from the aircraft cabin.

17. The method of claim 14, and further comprising driving a compressor of the air cycle system with an electric motor.

18. The conditioning system of claim 14, and further comprising controlling a rotational speed of the compressor based on at least one of an air temperature of the aircraft cabin, an air temperature of the cabin airflow provided by the mixing chamber, an air temperature of the recirculation airflow received from the air cycle system outlet, and an air temperature of the conditioned airflow received from the environmental control system pack.

* * * * *